UNITED STATES PATENT OFFICE.

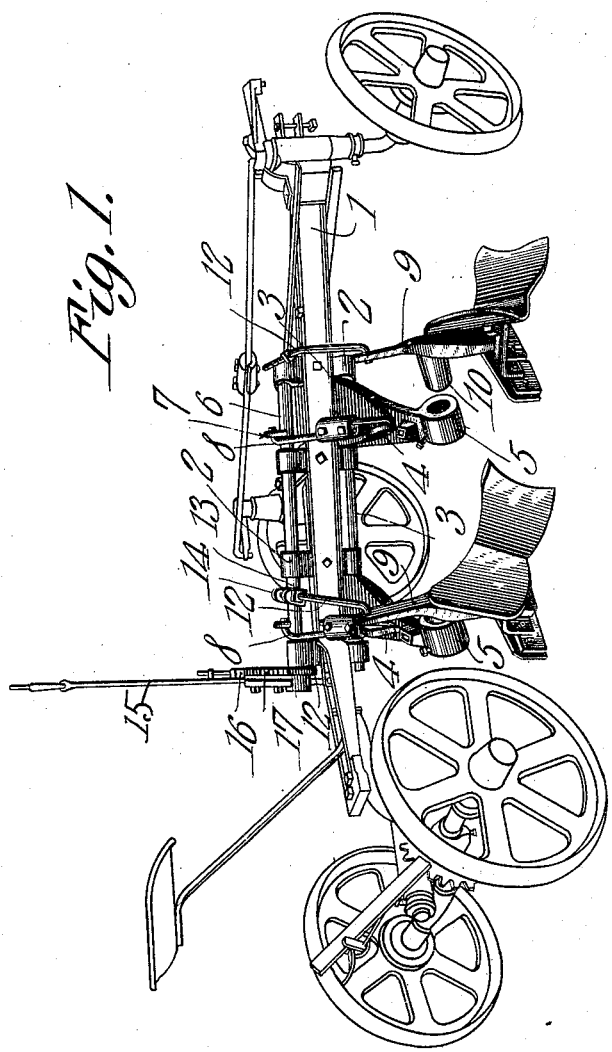

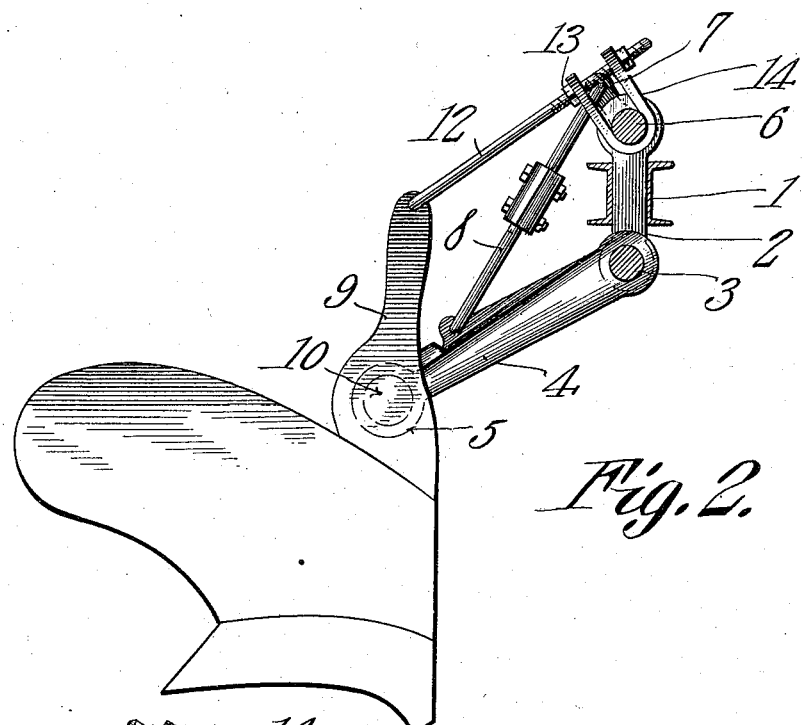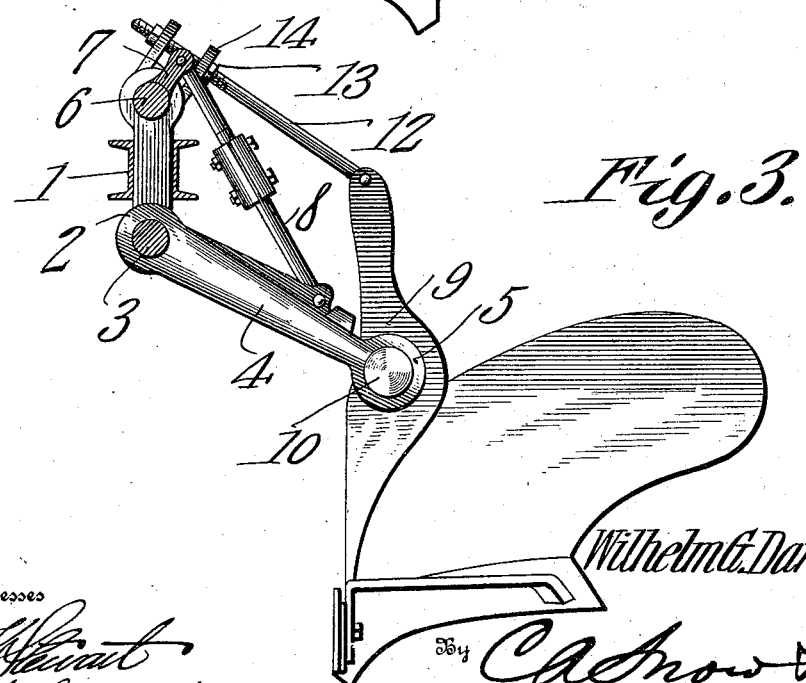

WILHELM G. DANIELSEN, OF INDEPENDENCE, MISSOURI.

PLOW.

966,662.  Specification of Letters Patent.  Patented Aug. 9, 1910.

Application filed October 11, 1909. Serial No. 522,030.

*To all whom it may concern:*

Be it known that I, WILHELM G. DANIELSEN, a citizen of the United States, residing at Independence, in the county of Jackson and State of Missouri, have invented a new and useful Plow, of which the following is a specification.

This invention has relation to mounts for plow standards and it consists in the novel construction and arrangement of its parts as hereinafter shown and described.

The mount herein shown and described is especially adapted to be used upon plows which may be converted from the disk type into the share and mold-board type and it is the object of the present invention to provide a standard for supporting a share and mold-board bottom in such manner that the share will be in horizontal position or substantially so irrespective of vertical adjustment. Convertible plows as indicated usually include a wheel mounted frame upon which is journaled a shaft provided with laterally disposed arms provided with bearings at their outer ends. A second shaft is journaled upon the frame and is provided with lever mechanism for rotating the same. Links connect the said second shaft with the said arms and thus as the second shaft is rotated, the arms are swung about the axis of the first said shaft. When the plow is in the form of a disk plow, the hubs of the disks are journaled in the bearings provided at the ends of the arm and consequently as the arms are raised or lowered at their outer ends the depth at which the disks will cut into the soil may be regulated. However in some features it is desirable to remove the disks and substitute share and mold-board bottoms in their stead. This contingency is provided for by mounting the share and mold-board bottom upon a standard which in turn is provided with a gudgeon adapted to enter the bearing in the arm. The upper portion of the standard projects above the arm and a link is pivotally connected at its outer end with the upwardly extending portion of the standard and at its inner end is connected with the second said shaft. Therefore when the second said shaft is turned and the arm is swung about the axis of the first shaft the link connected with the upwardly projecting portion of the standard and the second said shaft and rotating about the axis of the second said shaft will have a tendency to hold the standards in an erect or upright position and the share of the bottom in a horizontal or approximately horizontal position within the range of its adjustment for soil turning purposes.

In the accompanying drawings:—Figure 1 is a perspective view of a plow provided with the standard mount. Figs. 2 and 3 are detail transverse sectional views of the same.

As illustrated in the accompanying drawings, the plow structure includes a wheel mounted frame 1 having along its length and at suitable intervals bearings 2. A shaft 3 is journaled in the bearings 2 and is provided with one or more laterally disposed arms 4 having at its or their outer ends bearings 5. The said bearings 5 usually receive the hubs of disks (not shown) but as will appear hereinafter the bearings are put to other uses. A shaft 6 is also journaled in the bearing block 2 and the preferable and usual arrangement of the said shafts and bearing block is substantially that as shown, namely the shaft 3 is located below the frame 1 while the shaft 6 is located above the same. The shaft 6 is provided with laterally disposed lugs 7 and links 8 are pivotally connected at their inner ends to the lugs 7 and at their outer ends to the arms 4 at points intermediate the ends thereof. The structure heretofore described and referred to by numeral is that usually employed in an adjustable rotary disk plow but its description is essential in that this or a similar arrangement must be relied upon to carry the subject matter of this invention into practical effect.

A standard 9 is provided at a point intermediate its ends and upon its rear side with gudgeon 10 which is adapted to journal in the bearing 5 of the arm 4. A plow bottom of the share and mold board type is mounted at the lower end of the standard 9 in the usual manner. A link 12 is pivotally connected at the outer end to the upper end of the standard 9 and the inner end of the said link 12 is pivotally connected with the frame 1 and in the present instance being shown as being indirectly connected with the said frame by attaching with the shaft 6. As illustrated in the drawing, the attaching means for the inner end of the link 12 consists of a yoke 14 adapted to receive the shaft 6 and nuts 13 adjustably mounted upon the said link 12 and therefore it will be seen that the link 12 may be moved longitudinally with relation to the axis of the shaft 6 by adjusting the nuts 13 thereon. It is understood that as many standards 9 and attaching parts may be provided as there are arms 4 upon the plow structure. The shaft 6 is provided with a lever mechanism 15 whereby the said shaft may be rotated upon its axis and the lever 15 carries a spring actuated pawl 16 which is adapted to engage a gear segment 17 mounted upon the frame 1. Thus the lever 15 when swung may be secured at an adjusted position. As the shaft 6 rotates as above indicated, the arms 7 are carried around its axis and through the link 8 the arm 4 is swung about the axis of the shaft 3. Thus the bearing 5 is raised or lowered and the standard 9 is moved correspondingly. At the same time, the link 12 swings about an axis and the standard 9 is held in an erect or upright position and the share mounted upon the lower end thereof is held in a horizontal or substantially horizontal position. Thus as the standard 9 is adjusted vertically to cause the share to cut at a greater or less extent into the soil the raising or lowering of the standard does not affect the angle or disposition of the share with relation to the ground.

Having described my invention, what I claim as new and desire to secure by Letters Patent is:—

A plow including a frame, spaced shafts carried by the frame, a laterally disposed arm carried by one of the shafts, a standard pivoted to said arm, a furrow opener carried by said standard, a link pivotally connected to the upper portion of said standard and adjustably connected with the other of said shafts, a laterally disposed lug carried by the last mentioned shaft, a longitudinally extensible link connected with the said lug and the outer portion of said arm, and means for turning the last mentioned shaft upon its axis whereby the furrow opener will be moved about the axis of the first mentioned shaft without changing the disposition of the standard with relation to a horizontal plane.

In testimony that I claim the foregoing as my own, I have hereto affixed my signature in the presence of two witnesses.

WILHELM G. DANIELSEN.

Witnesses:
ROLAND C. BOOTH,
C. E. DOYLE.